US010203508B2

(12) United States Patent
Hering et al.

(10) Patent No.: US 10,203,508 B2
(45) Date of Patent: Feb. 12, 2019

(54) LIGHTING DEVICE

(71) Applicant: OSRAM GmbH, Munich (DE)

(72) Inventors: Oliver Hering, Niederstotzingen (DE); Juergen Hager, Herbrechtingen (DE); Stephan Schwaiger, Ulm (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 14/525,335

(22) Filed: Oct. 28, 2014

(65) Prior Publication Data
US 2015/0146302 A1 May 28, 2015

(30) Foreign Application Priority Data
Nov. 22, 2013 (DE) .......................... 10 2013 223 947

(51) Int. Cl.
G02B 27/14 (2006.01)
(52) U.S. Cl.
CPC ................... G02B 27/141 (2013.01)
(58) Field of Classification Search
CPC ............... G02B 27/141; G02F 1/353; G02F 2001/3507
USPC ......................................... 359/634
See application file for complete search history.

(56) References Cited

U.S. PATENT DOCUMENTS 4,599,537 A 7/1986 Yamashita
2011/0032532 A1* 2/2011 Hirano .................. B82Y 10/00
356/491

2012/0133846 A1 5/2012 Ishii
2012/0275134 A1 11/2012 Takahashi et al.
2013/0250544 A1* 9/2013 Zink ..................... H01L 33/505
362/84
2014/0376205 A1* 12/2014 Takizawa ................ H01S 5/005
362/84

FOREIGN PATENT DOCUMENTS

CN 102460747 A 5/2012
CN 102734659 A 10/2012
(Continued)

OTHER PUBLICATIONS

German Search Office Action issued in the corresponding German Application 102013223947.5 dated May 12, 2014.
(Continued)

Primary Examiner — Robert E Tallman
(74) Attorney, Agent, or Firm — Viering Jentschura & Partner mbb

(57) ABSTRACT

A lighting device may include at least one light source arrangement for generating primary light; at least one light wavelength conversion element for converting primary light into secondary light; and a filter apparatus disposed optically downstream of the at least one light wavelength conversion element and serving for filtering out primary light. The at least one light source arrangement and the at least one light wavelength conversion element are embodied or correspondingly embodied light directing means are provided in such a way that part of the primary light generated by the at least one light source arrangement impinges on the at least one light wavelength conversion element and part of the primary light generated by the at least one light source arrangement is directed past the at least one light wavelength conversion element.

9 Claims, 4 Drawing Sheets

(56) References Cited

FOREIGN PATENT DOCUMENTS

| | | |
|---|---|---|
| CN | 203930220 U | 11/2014 |
| DE | 3315675 A1 | 11/1983 |
| DE | 102010062463 A1 | 6/2012 |
| DE | 202012005157 U1 | 9/2013 |
| WO | 2010143093 A1 | 12/2010 |

OTHER PUBLICATIONS

Chinese Office Action based on application No. 201410681623.X (6 pages and 6 pages of English translation) dated Jun. 2, 2017 (Reference Purpose Only).

\* cited by examiner

LIGHTING DEVICE

CROSS-REFERENCE TO RELATED APPLICATION

This application claims priority to German Patent Application Serial No. 10 2013 223 947.5, which was filed Nov. 22, 2013, and is incorporated herein by reference in its entirety.

TECHNICAL FIELD

Various embodiments relate generally to a lighting device.

BACKGROUND

A lighting device of this type is disclosed in DE 10 2010 062463 A1, for example. Said document describes a lighting device including a light source arrangement for generating primary light and a light wavelength conversion element for proportionally converting primary light into secondary light, and a reflector, which reflects the primary light and the secondary light.

SUMMARY

A lighting device may include at least one light source arrangement for generating primary light; at least one light wavelength conversion element for converting primary light into secondary light; and a filter apparatus disposed optically downstream of the at least one light wavelength conversion element and serving for filtering out primary light. The at least one light source arrangement and the at least one light wavelength conversion element are embodied or correspondingly embodied light directing means are provided in such a way that part of the primary light generated by the at least one light source arrangement impinges on the at least one light wavelength conversion element and part of the primary light generated by the at least one light source arrangement is directed past the at least one light wavelength conversion element.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
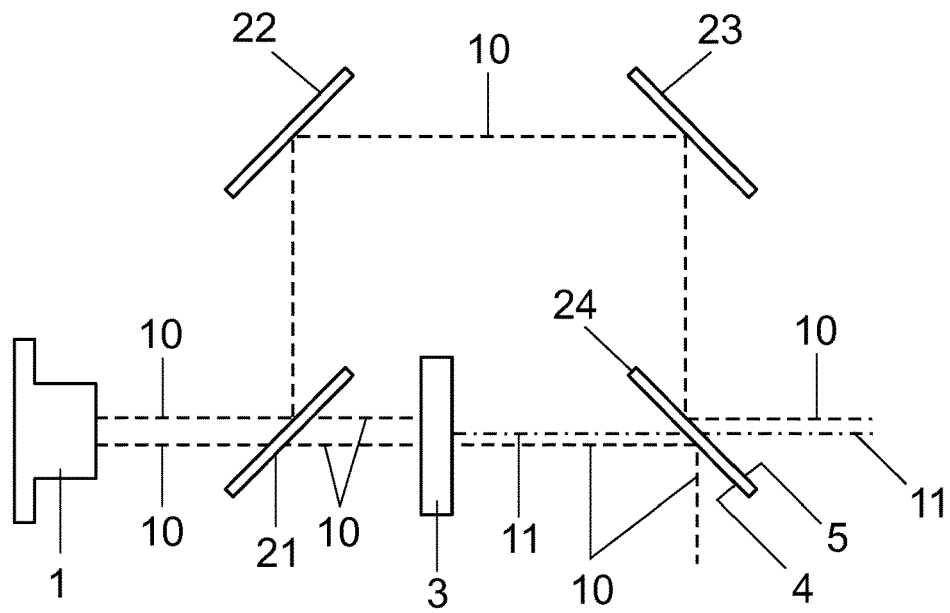
FIG. 1 shows a lighting device in accordance with a first embodiment.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments provide a lighting device of the generic type which, in the case of a defective or absent light wavelength conversion element emits no primary light or only a reduced proportion of primary light.

The lighting device according to various embodiments has at least one light source arrangement for generating primary light and at least one light wavelength conversion element for converting primary light into secondary light. The at least one light source arrangement and the at least one light wavelength conversion element are embodied or correspondingly embodied light directing means are provided in such a way that part of the light generated by the at least one light source arrangement impinges on the at least one light wavelength conversion element and part of the light generated by the at least one light source arrangement is directed past the at least one light wavelength conversion element. The lighting device according to various embodiments has a filter apparatus disposed optically downstream of the at least one light wavelength conversion element and serving for filtering out primary light. The expression "filter apparatus disposed optically downstream of the at least one light wavelength conversion element" denotes a filter apparatus which is arranged in the light path or light beam path downstream of the at least one light wavelength conversion element, such that the light impinges on the filter apparatus only after passing through the at least one light wavelength conversion element.

By virtue of the abovementioned construction of the lighting device according to various embodiments, in the case of a defective or absent light wavelength conversion element, a significant part of the primary light is filtered out by means of the filter apparatus, such that in the case of a fault the lighting device according to various embodiments emits only that part of the primary light which is guided past the light wavelength conversion element. In this way, the human eye is protected against excessively high intensity of the primary light in the case of a defective or absent light wavelength conversion element.

The lighting device according to various embodiments additionally may have the effect that splitting the primary light into a part that impinges on the at least one light wavelength conversion element and into a part that is guided past the at least one light wavelength conversion element affords an additional possibility for setting the relative proportions of the primary light and secondary light emitted by the lighting device according to various embodiments.

Alongside the configuration of the at least one light wavelength conversion element, in the case of the lighting device according to various embodiments, the relative proportion of primary light and secondary light in the light emitted by the lighting device according to various embodiments can additionally also be controlled by means of the splitting of the intensities of the primary light impinging on the at least one light wavelength conversion element and of the primary light guided past the at least one light wavelength conversion element.

The filter apparatus of the lighting device according to various embodiments may be embodied as transparent to secondary light. This ensures that, in the case of the light emitted by the at least one light wavelength conversion element, only the non-converted primary light is blocked. For this purpose, the filter apparatus may be embodied as either light-reflecting or light-absorbing for the primary light.

The at least one light source arrangement of the lighting device according to various embodiments may have at least one laser diode in order to be able to generate primary light from a narrowly delimited wavelength range with high intensity and high luminance.

The primary light generated by the at least one light source arrangement may be light having wavelengths from the wavelength range of 380 nanometers to 490 nanometers. Primary light from this wavelength range may have the effect that the customary phosphors that can be excited by means of ultraviolet radiation (UV radiation) and blue light can be used for the wavelength conversion of the primary light. In various embodiments, the at least one light wavelength conversion element therefore has phosphor for the wavelength conversion of the primary light.

Cerium-doped yttrium aluminum garnet (YAG:Ce) may be used as phosphor for the at least one light wavelength conversion element of the lighting device according to various embodiments. The aforementioned phosphor may have the effect that it converts the abovementioned primary light from the spectral range of UV radiation and blue light proportionally into secondary light having dominant wavelengths from the wavelength range of 520 nanometers to 590 nanometers. As a result, the light wavelength conversion element may emit light having wavelengths from the spectral range of approximately 380 nanometers to 800 nanometers. The emission of white light that is a mixture of non-converted blue primary light and converted yellow secondary light may therefore be made possible for the lighting device according to various embodiments.

In various embodiments, the lighting device may have an optical unit for mixing primary light and secondary light, the optical unit being disposed optically downstream of the filter apparatus. The optical unit enables the emission of homogeneous white light.

In accordance with various embodiments, the at least one light wavelength conversion element and the filter apparatus of the lighting device in each case may have at least one transmission region for primary light. Splitting of primary light and secondary light into different light paths may thereby be achieved in a very simple manner without additional components.

In various embodiments, the at least one transmission region of the at least one light wavelength conversion element or of the filter apparatus may be embodied as light-scattering. As a result, the primary light passing through the transmission region is scattered and, consequently, safety for observers is increased and the homogeneity of the white light emitted by the lighting device is improved as well. By means of an additional optical unit disposed downstream, for example configured as a light mixing element "mixing rod", primary light and secondary light can be further mixed and homogenized.

In accordance with various embodiments, the lighting device, for the purpose of improving safety, may have light directing means in the form of mirrors which direct part of the primary light past the at least one light wavelength conversion element.

The lighting device according to various embodiments may serve as a white light source for a motor vehicle headlight.

FIG. 1 schematically depicts the lighting device in accordance with the first embodiment.

This lighting device has a light source arrangement 1 for generating primary light 10, a light wavelength conversion element 3 for the wavelength conversion of primary light into secondary light 11, light directing means 21, 22, 23, 24 and a filter apparatus 4 for filtering out primary light 10.

The light source arrangement 1 may consist of a plurality of laser diodes, for example three laser diodes, which generate blue light having wavelengths from the wavelength range of 380 nanometers to 490 nanometers during their operation, and of an optical unit, which collimates the laser light generated by the laser diodes, said laser light also being called primary light 10, and combines it to form a light beam. Such a light source arrangement 1 is disclosed, for example, in DE 10 2012 005157 U1. During the operation of the lighting device, the light source arrangement 1 emits collimated primary light 10, which is directed onto the partly light-transmissive mirror 21 of the light directing means 21, 22, 23, 24.

The light wavelength conversion element 3 may consist+s of a light-transmissive sapphire lamina coated with phosphor. Cerium-doped yttrium aluminum garnet (YAG:Ce) serves as phosphor. At least one part of the primary light impinging on the light wavelength conversion element 3 is converted into secondary light 11 by means of the abovementioned phosphor. Another part of the primary light 10 impinging on the light wavelength conversion element 3 passes through the light wavelength conversion element 3 without wavelength conversion. The relative proportions of primary light 10 and secondary light 11 in the light emitted by the light wavelength conversion element 3 are dependent on the thickness and concentration of the phosphor in the light wavelength conversion element 3. The secondary light 11 is yellow light having dominant wavelengths from the wavelength range of 520 nanometers to 590 nanometers. As a result, the light wavelength conversion element 3 emits light having wavelengths from the spectral range of approximately 380 nanometers to 800 nanometers.

The light directing means 21, 22, 23, 24 may consist of a first mirror 21, which is semi-transmissive to primary light 10 and which is arranged between the light source arrangement 1 and the light wavelength conversion element 3 in the light path of the primary light 10, two further mirrors 22, 23 and a fourth mirror 24, which is transparent to secondary light 11 and is embodied as reflective for primary light 10. The first mirror 21 is embodied and arranged in such a way that approximately 70% to 85% of the energy of the primary light 10 passes through the first mirror 21 and impinges on the light wavelength conversion element 3, while approximately 15% to 30% of the energy of the primary light 10 is reflected at the first mirror 21. By means of the first mirror 21 and second mirror 22, approximately 15% to 30% of the energy of the primary light 10 generated by the light source arrangement 1 is directed past the light wavelength conversion element 3 and, by means of the third mirror 23 and the fourth mirror 24, the primary light 10 directed past the light wavelength conversion element 3 is directed again in the original emission direction of the primary light 10 emitted by the light source arrangement 1 and is mixed with the secondary light 11 emitted by the light wavelength conversion element 3.

The second mirror 22 and third mirror 23 are embodied as light-reflecting, such that light impinging on them is reflected. The fourth mirror 24 is embodied as transparent to secondary light 11. The front side 4 and the rear side 5 of the fourth mirror 24 are embodied in each case as light-reflecting for the primary light 10. At the front side 4 of the fourth mirror 24, the non-converted portion of the primary light 10 that is emitted by the light wavelength conversion element 3 is reflected and deflected from the original emission direction of the primary light 10, while at the rear side 5 of the fourth mirror 24, that portion of the primary light 10 which is directed past the light wavelength conversion element 3 is reflected and is directed back in the original emission direction of the primary light 10 emitted by the light source arrangement 1. All the mirrors 21, 22, 23, 24 are embodied as dichroic mirrors.

In the case of the lighting device in accordance with the first embodiment of the invention, the abovementioned filter apparatus 4 for filtering out primary light 10 is formed by the front side 4 of the fourth mirror 24, said front side being embodied as reflective for primary light 10.

The functioning of the lighting device in accordance with the first embodiment is explained below.

The primary light 10 emitted by the light source arrangement is split into two different light paths at the first, partly light-transmissive mirror 21. Approximately 70% to 85% of the energy of the primary light 10 is transmitted by the first mirror 21, such that it is guided along a first light path and impinges on the light wavelength conversion element 3. After passing through the light wavelength conversion element 3, the primary light 10 impinging on the light wavelength conversion element 3 is partly converted into secondary light 11 and partly transmitted without wavelength conversion. Both the secondary light 11 emitted by the light wavelength conversion element 3 and the non-converted primary light 10 transmitted by the light wavelength conversion element 3 impinge on the front side 4 of the fourth mirror 24. The secondary light 11 passes through the fourth mirror 24, while the primary light 10 transmitted by the light wavelength conversion element 3 is reflected at the front side 4 of the fourth mirror 24 and deflected from the original emission direction of the light emitted by the light source arrangement 1 and for example is absorbed by means an absorber (not depicted) or alternatively is detected and monitored by means of a light sensor and, if appropriate, that is to say in the case of a defective light wavelength conversion element 3, is used for the safety shutdown of the entire system.

At the first, partly light-transmissive mirror 21, approximately 15% to 30% of the energy of the primary light 10 is reflected and directed along a second light path past the light wavelength conversion element 3. With the aid of the second mirror 22 and the third mirror 23, the primary light 10 reflected at the first mirror 21 is deflected, such that it impinges on the rear side 5 of the fourth mirror 24. At the rear side 5 of the fourth mirror 24, which is transparent to secondary light 11, the primary light 10 reflected at the first mirror 21 is again reflected and directed again in the original direction of the light emitted by the light source arrangement 1. As a result, the secondary light 11 emitted by the light wavelength conversion element 3, after passing through the fourth mirror 24 transparent to secondary light 11, combines with that portion of the primary light 10 which is reflected at the rear side 5 of the fourth mirror 24 to form a common light beam of white light, since the mixing of blue primary light 10 and yellow secondary light 11 produces white light. The white mixed light can optionally also be homogenized by means of an optical unit (not depicted) disposed optically downstream of the fourth mirror 24.

Figure 2:
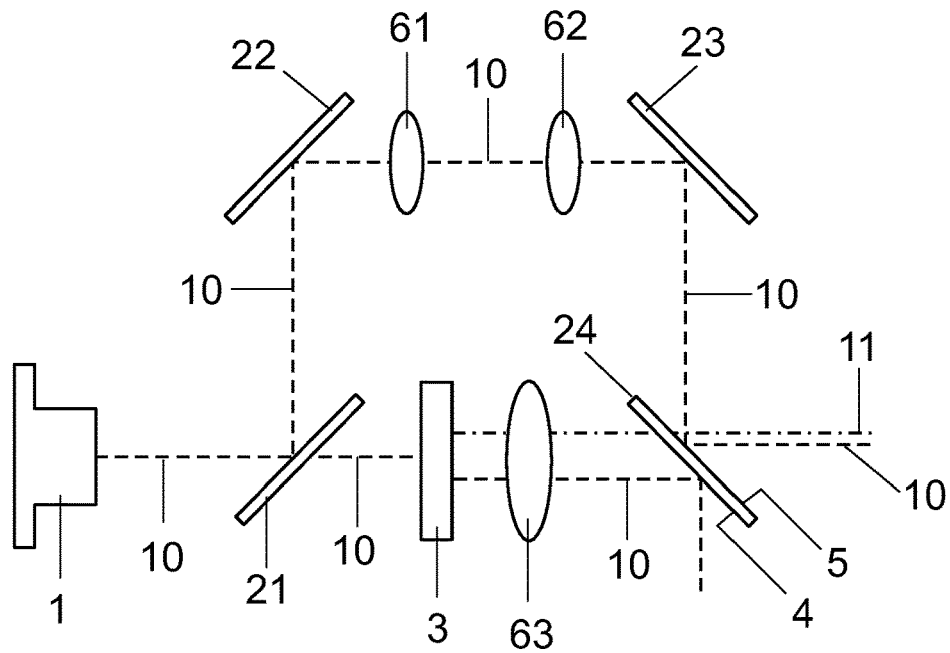
FIG. 2 shows a lighting device in accordance with a second embodiment.

FIG. 2 schematically depicts a lighting device in accordance with a second embodiment. The lighting device in accordance with the second embodiment differs from the above-described lighting device in accordance with the first embodiment only by virtue of additional optical lenses 61, 62, 63 serving for light beam shaping. In all other details, the lighting devices in accordance with the first and second embodiments of the invention are identical. Therefore, in the case of the embodiments in FIG. 1 and FIG. 2, the same reference signs are used for identical components and, for the description thereof, reference is made to the corresponding description concerning the first embodiment.

The optical lens 63 is arranged in the light path of the light emitted by the light wavelength conversion element 3, between the light wavelength conversion element 3 and the fourth mirror 24. The optical lens 63 serves for concentrating the secondary light 11 emitted by the light wavelength conversion element 3 and for concentrating the non-converted primary light 10 transmitted by the light wavelength conversion element 3. It reduces the divergence of the secondary and primary light scattered at the phosphor particles of the light wavelength conversion element 3.

Figure 3:
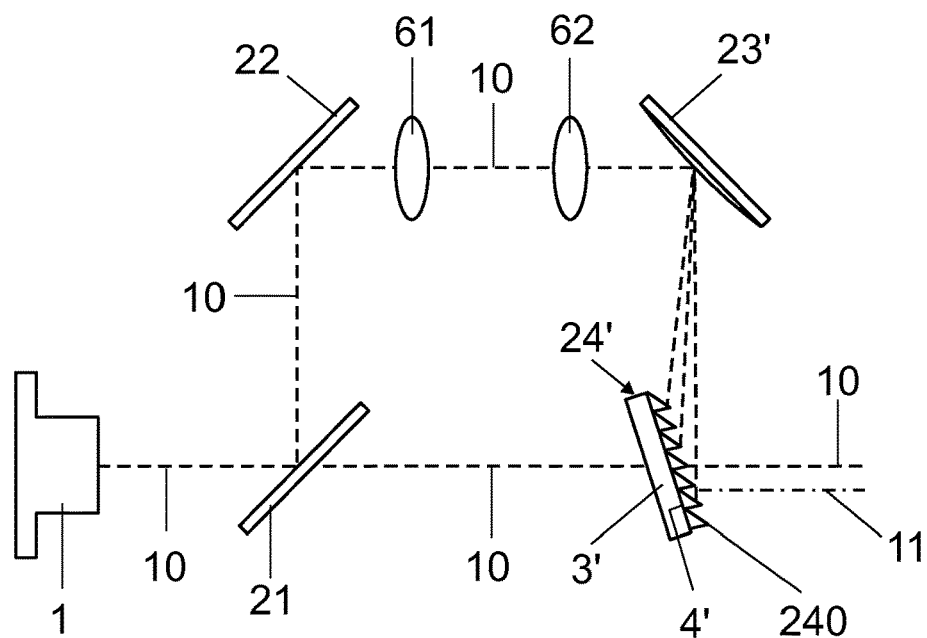
FIG. 3 shows a lighting device in accordance with a third embodiment.

FIG. 3 schematically depicts a lighting device in accordance with a third embodiment.

The lighting device in accordance with the third embodiment differs from the lighting device in accordance with the first embodiment only in that two optical lenses 61, 62 for beam shaping are arranged between the second mirror 22 and the third mirror 23' as already described in the case of the second embodiment, and in that the light wavelength conversion element 3 and the filter apparatus 4 and the fourth mirror 24 are embodied as a structural unit. Moreover, the third mirror 23' has a curved reflective surface. In all other details, the lighting devices in accordance with the first and third embodiments of the invention are identical. Therefore, in the case of the embodiments in FIG. 1 to FIG. 3, the same reference signs are used for identical components and, for the description thereof, reference is made to the corresponding description concerning the first embodiment.

The differences between the lighting devices in accordance with the first and third embodiments are discussed in greater detail below.

In the case of the lighting device in accordance with the third embodiment, the light wavelength conversion element 3', the filter apparatus 4' and the fourth mirror 24' are embodied as a structural unit.

The light wavelength conversion element 3' may consist of a sapphire lamina coated with phosphor on its front side facing the first mirror 21 and the light source arrangement 1, wherein cerium-doped yttrium aluminum garnet (YAG:Ce) may be used as phosphor. The rear side of the sapphire lamina facing away from the first mirror 21 and the light source arrangement 1 is provided with a dichroic coating 4', which is reflective for primary light 10 and transparent to secondary light 11. In addition, at the rear side of the sapphire lamina, a microprism structure 240 may be arranged on the dichroic coating 4' and together with the dichroic coating 4' forms the fourth mirror 24'. Alternatively, the dichroic coating 4' can also be arranged on the microprism structure 240.

The primary light 10 transmitted by the first mirror 21 is proportionally converted into secondary light 11 by the light wavelength conversion element 3'. The secondary light 11 passes through the dichroic coating 4' and the microprism structure 240, wherein the microprism structure has a light-scattering effect on the secondary light 11 under certain circumstances. That portion of the primary light 10 which passes through the light wavelength conversion element 3' and is not converted by the light wavelength conversion element 3' is reflected back into the light wavelength conversion element 3' at the dichroic coating 4'.

That part of the primary light 10 which is reflected at the first mirror 21, after reflection at the curved surface of the third mirror 23' is directed onto the microprism structure 240 and the underlying surface of the dichroic coating 4'. This part of the primary light 10 is reflected at the dichroic coating 4' in the direction of the original emission direction of the primary light 10 emitted by the light source arrangement. In this case, the microprism structure 240 has a light-scattering effect under certain circumstances. By means of the microprism structure 240 the abovementioned part of the primary light 10 and the secondary light 11 are mixed homogeneously in order to generate white light that is as homogeneous as possible. The reflection at the curved surface of the third mirror 23' results in expansion of that part of the primary light 10 which impinges on the microprism structure 240 and the dichroic coating 4'.

The secondary light 11 emitted by the light wavelength conversion element 3 is usually emitted with a Lambertian light distribution. The dichroic coating 4' and the microprism structure 240 are designed in such a way that primary light 10 deflected by the third mirror 23' is deflected such that it has as far as possible the same angular distribution as the transmitted secondary light 11.

Figure 4:
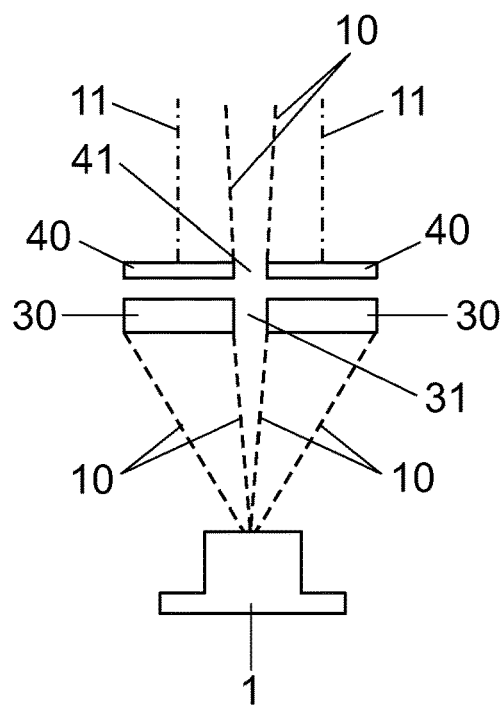
FIG. 4 shows a lighting device in accordance with a fourth embodiment.

FIG. 4 schematically depicts a lighting device in accordance with the fourth embodiment.

This lighting device has a light source arrangement 1 embodied identically to the light source arrangement of the lighting device in accordance with the first embodiment, a light wavelength conversion element 30 and a filter apparatus 40.

The light wavelength conversion element 30 consists of a light-transmissive sapphire lamina coated with phosphor, wherein cerium-doped yttrium aluminum garnet (YAG:Ce) is used as phosphor. The sapphire lamina or the light wavelength conversion element 30 is embodied in the shape of an annular disk and has a perforation 31 arranged centrally. The external diameter of the sapphire lamina or of the light wavelength conversion element 30 may have a value in the range of 1 mm to 5 mm. Its internal diameter may be less than 1 mm, and e.g. less than 0.1 mm in order to obtain a comparatively small proportion of primary light 10 that is directed past the light wavelength conversion element 3.

The filter apparatus 40 is embodied as a dichroic mirror in the shape of an annular disk having a central perforation 41, that is arranged coaxially with respect to the light wavelength conversion element 30. External and internal diameters of the filter apparatus 40 are identical to the corresponding dimensions of the light wavelength conversion element 30. The filter apparatus 40 is disposed optically downstream of the light wavelength conversion element 30. That is to say that the light wavelength conversion element 30 is arranged between the light source arrangement 1 and the filter apparatus 40, such that the light emitted by the light source arrangement 1 firstly impinges on the light wavelength conversion element 30 before it reaches the filter apparatus 40. The filter apparatus 40 is preferably arranged at a small distance or no distance from the light wavelength conversion element 30.

The functioning of the lighting device in accordance with the fourth embodiment is explained below.

The light source arrangement 1 emits light that is embodied as light having wavelengths from the wavelength range of 380 nanometers to 490 nanometers and is also designated as primary light 10. This is light from the blue spectral range. Part of said primary light 10 passes through the light wavelength conversion element 30 and the dichroic mirror 40 via the perforations 31 and 41 in the aforementioned optical components 30, 40.

That part of the primary light 10 which impinges on the light wavelength conversion element 30 outside the perforation 31 is proportionally converted into yellow light having dominant wavelengths from the wavelength range of 520 nanometers to 590 nanometers upon passing through the light wavelength conversion element 30. As a result, the light wavelength conversion element 3 emits light having wavelengths from the spectral range of approximately 380 nanometers to 800 nanometers. The converted light is also designated as secondary light 11. The dichroic mirror 40 is embodied as transparent to light having wavelengths from the spectral range of the secondary light 11. Therefore, the secondary light 11 emitted by the light wavelength conversion element 30 passes through the dichroic mirror 40. That portion of the primary light 10 which impinges on the light wavelength conversion element 30 outside the perforation 31 and leaves the light wavelength conversion element 30 without being converted into secondary light 11 impinges on the filter apparatus 40 outside the perforation 41 and is reflected back to the light wavelength conversion element 30 because the filter apparatus 40 is embodied as a dichroic mirror that reflects light from the wavelength range of the primary light 10.

Therefore, on that side of the filter apparatus 40 which faces away from the light source arrangement 1 and the light wavelength conversion element 30, light is emitted which is a mixture of primary light 10 that emerges from the central perforation 41 and secondary light 11 that passes through the filter apparatus 40. The mixing of blue primary light 10 and yellow secondary light 11 produces white light, such that the lighting device in accordance with the fourth embodiment emits white light.

Figure 5:
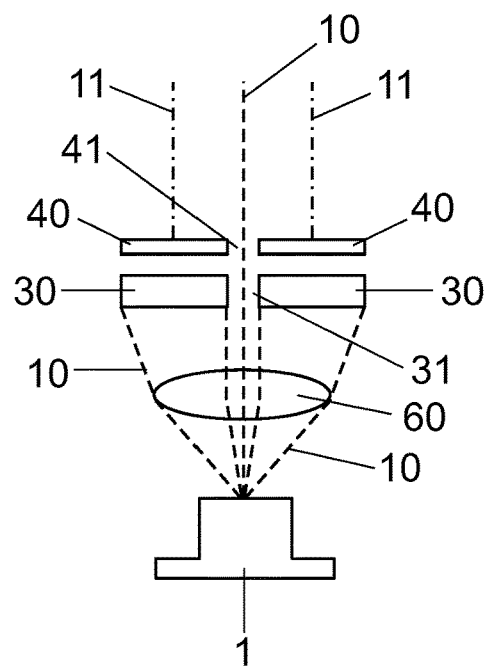
FIG. 5 shows a lighting device in accordance with a fifth embodiment.

FIG. 5 schematically depicts a lighting device in accordance with the fifth embodiment. The lighting device in accordance with the fifth embodiment differs from the above-described lighting device in accordance with the fourth embodiment only in an additional optical lens 60 serving for light beam shaping. In all other details, the lighting devices in accordance with the fourth and fifth embodiments are identical. Therefore, in the case of the embodiments in FIG. 4 and FIG. 5, the same reference signs are used for identical components and, for the description thereof, reference is made to the corresponding description concerning the fourth embodiment. The optical lens 60 serves for focusing the light emitted by the light source arrangement 1 onto the light wavelength conversion element 30.

Figure 6:
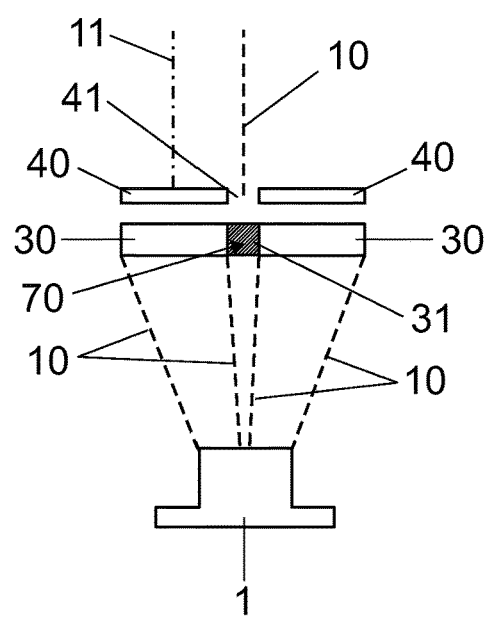
FIG. 6 shows a lighting device in accordance with a sixth embodiment.

FIG. 6 schematically depicts a lighting device in accordance with the sixth embodiment. The lighting device in accordance with the sixth embodiment differs from the above-described lighting device in accordance with the fourth embodiment only in that a light-scattering element 70 is arranged in the perforation 31 of the light wavelength conversion element 30. In all other details, the lighting devices in accordance with the fourth and sixth embodiments are identical. Therefore, in the case of the embodiments in FIG. 4 and FIG. 6, the same reference signs are used for identical components and, for the description thereof, reference is made to the corresponding description concerning the fourth embodiment. The light-scattering element 70 scatters the primary light 10 passing through the perforation 31 and therefore ensures a more homogeneous mixture of secondary light 11 and primary light 10 on that side of the filter apparatus 40 which faces away from the light source arrangement 1 and the light wavelength conversion element 30. Moreover, the light-scattering element 70 reduces the coherence of the primary radiation and thus additionally serves for the safety of the laser radiation. The lighting device in accordance with the sixth embodiment therefore emits white light which is more homogeneous with regard to the annular distribution in comparison with the fourth embodiment.

Figure 7:
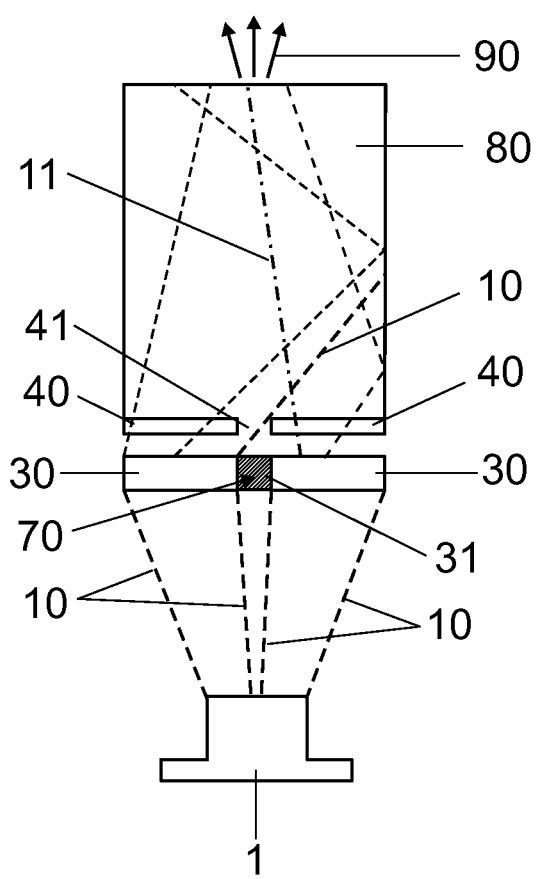
FIG. 7 shows a lighting device in accordance with a seventh embodiment.

FIG. 7 schematically depicts a lighting device in accordance with the seventh embodiment. The lighting device in accordance with the seventh embodiment differs from the above-described lighting device in accordance with the sixth embodiment only in that a rod-shaped light mixing element 80 is additionally provided, which is disposed optically downstream of the filter apparatus 40. In all other details, the lighting devices in accordance with the sixth and seventh embodiments are identical. Therefore, in the case of the embodiments in FIG. 4, FIG. 6 and FIG. 7, the same reference signs are used for identical components and, for the description thereof, reference is made to the corresponding description concerning the fourth and sixth embodiments.

The rod-shaped light mixing element 80 is embodied as circular-cylindrical and arranged co-axially with respect to the light wavelength conversion element 30 and with respect to the filter apparatus 40. It has the same external diameter as the light wavelength conversion element 30 and the filter apparatus 40. The cylinder lateral surface of the light mixing element 80 is embodied as totally internally reflective, such that light coupled into the light mixing element 80 cannot leave the latter via the lateral surface, but rather only at its end faces.

The primary light 10 emitted by the light source arrangement 1 is coupled into the light mixing element 80 via the perforations 31 and 41 in the light wavelength conversion element 30 and the filter apparatus 40. Moreover, the secondary light 11 emitted by the light wavelength conversion element 30 is coupled into the light mixing element 80 via the filter apparatus 40, which is transparent to secondary light 11. Both the primary light 10 coupled into the light mixing element 80 and the secondary light 11 coupled into the light mixing element 80 are totally internally reflected many times at the lateral surface of the light mixing element 80 and are homogeneously mixed as a result. Therefore, homogeneous white light 90 that is a homogeneous mixture of blue primary light 10 and yellow secondary light 11 emerges from that end face of the light mixing element 80 which faces away from the light source arrangement 1. In order to improve the homogeneity of the white light 90, the length of the rod-shaped light mixing element 80 can be increased or the material of the light mixing element 80 can be admixed with light-scattering particles.

The lighting devices in accordance with the embodiments described above are provided for use as a white light source in motor vehicle headlights. Further application possibilities consist in the use as a white light source for projection apparatuses, for example for film and video projection, in technical and medical endoscopy, for light effects in the entertainment industry and for medical irradiation.

The invention is not restricted to the embodiments that have been explained in greater detail above. By way of example, components of the embodiments described above can be combined with one another. Moreover, the light wavelength conversion element and the filter apparatus can have further perforations instead of or in addition to the central perforation 31, 41, in order to ensure a more homogeneous mixture of primary and secondary light. Furthermore, the light mixing element 80 described above can alternatively have a different symmetry, for example a polygonal cross section, or no symmetry at all. In various embodiments, it is also possible to design the light mixing element 80 as a bent optical waveguide version or as a so-called "angle rotator", in order to deflect the light, if appropriate.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:
1. A lighting device, comprising:
at least one light source arrangement for generating primary light;
at least one light wavelength conversion element for converting primary light into secondary light; and
a filter apparatus disposed optically downstream of the at least one light wavelength conversion element and serving for filtering out primary light and being embodied as transparent to the secondary light emitted by the at least one light wavelength conversion element;
wherein light directing means are provided, said light directing means comprising a first mirror which is semi-transmissive to primary light and which is arranged between the at least one light source arrangement and the at least one light wavelength conversion element in the light path of the primary light in such a way that a first part of the primary light generated by the at least one light source arrangement passes through the first mirror and impinges on the at least one light wavelength conversion element, and a second part of the primary light generated by the at least one light source arrangement is reflected at the first mirror and is directed past the at least one light wavelength conversion element so that said second part of the primary light does not impinge on the at least one light wavelength conversion element; and wherein the light directing means comprise light-reflecting mirrors which are arranged in such a way that the second part of the primary light is redirected in an original emission direction of the primary light emitted by the at least one light source arrangement and is mixed with secondary light emitted by the at least one light wavelength conversion element and transmitted through the filter apparatus;
wherein the second part of the primary light and the secondary light are configured to form a common beam of white light.

2. The lighting device of claim 1,
wherein the at least one light source arrangement has at least one laser diode.

3. The lighting device of claim 1,
wherein the primary light generated by the at least one light source arrangement is light having wavelengths from the wavelength range of 380 nanometers to 490 nanometers.

4. The lighting device of claim 1,
wherein the at least one light wavelength conversion element has phosphor for light wavelength conversion of the primary light.

5. The lighting device of claim 1,
wherein the phosphor comprises cerium-doped yttrium aluminum garnet (YAG:Ce).

6. The lighting device of claim 1,
wherein the secondary light is light having dominant wavelengths from the wavelength range of 520 nanometers to 590 nanometers.

7. The lighting device of claim 1,
wherein an optical unit for mixing primary light and secondary light is disposed optically downstream of the filter apparatus.

8. The lighting device of claim 1,
wherein the light directing means comprise a mirror which is embodied as transparent to secondary light and reflective to primary light and which is arranged in the light path of the secondary light emitted by the at least one light wavelength conversion element and in the light path of the second part of the primary light directed past the at least one light wavelength conversion element.

9. The lighting device of claim 1,
wherein the first mirror is embodied and arranged in such a way that approximately 70 percent to 85 percent of the energy of the primary light generated by the at least one light source arrangement passes through the first mirror and impinges on the at least one light wavelength conversion element, and 15 percent to 30 percent of the energy of the primary light generated by the at least one light generated by the at least one light source arrangement is reflected at the first mirror.

* * * * *